Figure 1:
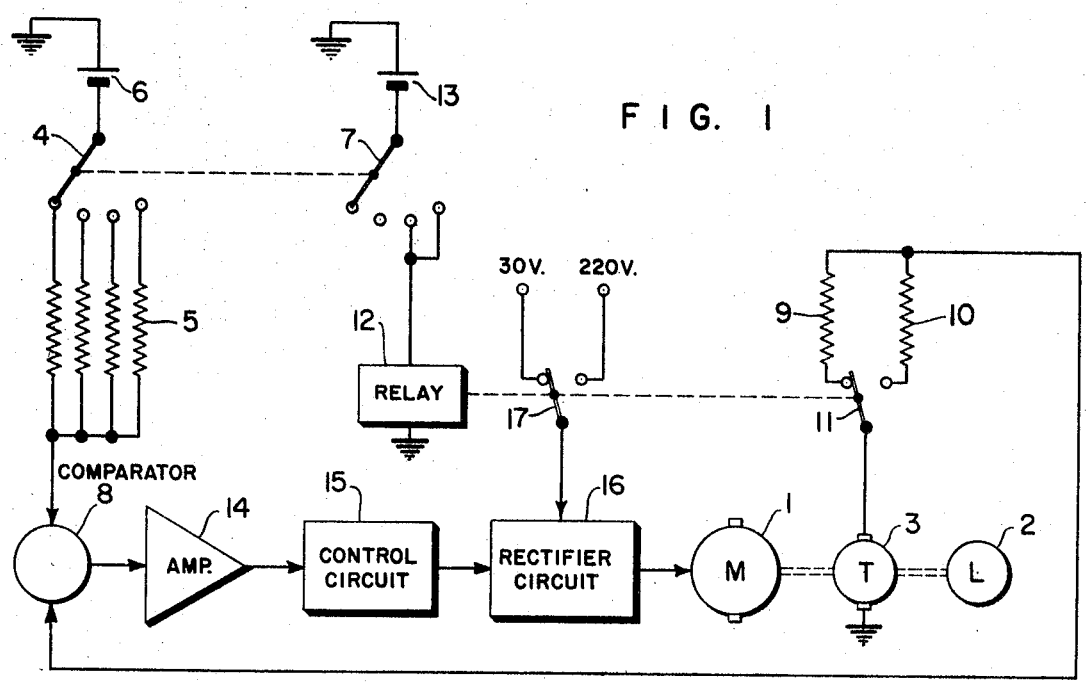

United States Patent

[11] 3,581,175

| [72] | Inventor | Manfred Merz<br>Doernigheim am Main, Germany |
|---|---|---|
| [21] | Appl. No. | 882,199 |
| [22] | Filed | Dec. 4, 1969 |
| [45] | Patented | May 25, 1971 |
| [73] | Assignee | Honeywell G.m.b.H.<br>Frankfurt am Main, Germany |
| [32] | Priority | Dec. 7, 1968 |
| [33] | | Germany |
| [31] | | P 18 13 384.1 |

[54] SPEED CONTROL CIRCUIT WITH TWO VOLTAGE SOURCES TO ENABLE PRECISE SPEED CONTROL OVER A LARGE SPEED RANGE
3 Claims, 3 Drawing Figs.

[52] U.S. Cl. ..................................................... 318/305,
318/327, 318/442, 318/500
[51] Int. Cl. ..................................................... H02p 5/00
[50] Field of Search........................................... 318/305,
308, 326, 327, 328, 336, 341, 345, 411, 440, 441,
442, 500

[56] References Cited
UNITED STATES PATENTS

| 2,473,903 | 6/1949 | Purifoy......................... | 318/440 |
| 3,086,156 | 4/1963 | Geissing........................ | 318/308 |
| 3,242,407 | 3/1966 | Hansen......................... | 318/327 |
| 3,500,161 | 3/1970 | Domann........................ | 318/308 |

*Primary Examiner*—Oris L. Rader
*Assistant Examiner*—Thomas Langer
*Attorneys*—Arthur H. Swanson, Lockwood D. Burton and George E. Bodenstein ABSTRACT: There is disclosed a control system for controlling the speed of the direct current electric motor over a wide range of speeds, for example, a speed range ratio of 1600:1. The speed of the motor is directly controlled by controlling the firing angle of a thyristor bridge network. In order to accomplish a high order accuracy over the very wide range, a voltage of a first magnitude is applied to the thyristor bridge network over a first portion of a range and a voltage of a second magnitude is applied to the thyristor bridge for a second portion of the range.

INVENTOR.
MANFRED MERZ
BY Lockwood D. Burton
ATTORNEY.

SPEED CONTROL CIRCUIT WITH TWO VOLTAGE SOURCES TO ENABLE PRECISE SPEED CONTROL OVER A LARGE SPEED RANGE

This invention relates to the speed control of direct current electric motors and is particularly concerned with speed control systems including a circuit for producing a pulsed output signal for driving the motor and a feedback path for maintaining the motor speed at substantially the required speed. In such a system the motor speed is controlled by varying the pulse duration, and hence the average power supplied to the motor. The pulses may have a constant amplitude, for instance they may constitute a square wave signal having an adjustable mark/ space ratio, or alternatively they may have a varying amplitude, as is the case if they consist of adjustable parts of successive or other half-cycles of a rectified AC voltage. The latter form of speed control is sometimes known as phase-shift control.

Such systems do not require mechanical transmission devices with their resultant energy dissipation and hence they have a good efficiency. This is of particular importance where the motor runs off a battery. However, they do have a disadvantage which can be serious, namely that there may be limitations on the range of accurate speed adjustment. The following example illustrates this. Suppose a motor is to have a speed range the maximum value of which is 1600 times the minimum value. This means that at the lowest speed the signal which is applied to the circuit which produces the pulsed output signal has a value which is only 1/1600 of its maximum possible value. Normally this signal is amplified before being applied to the circuit. The amplifier input signal is therefore even smaller and the amplification is almost certainly affected by ambient temperature changes, variations in the amplifier supply voltage and drift. Moreover at relatively low speeds the motor feedback signal is also very small which renders comparison with a signal representative of the required speed unreliable. The result is that at relatively low speeds, stable operation may not be attainable.

According to the present invention a speed control system of the same general kind previously described, that is incorporating a feedback path for maintaining the motor speed at substantially the required speed and including a circuit for producing a pulsed output signal for driving the motor, the pulses having a duration controlled by an input signal to the circuit, also includes a switching arrangement which, when the required speed reaches a particular value, switches from one state to another state and as a result alters both the pulse amplitude and the value of the feedback signal, the latter alteration causing an alteration in the said input signal and therefore in the pulse direction, the alteration in the latter of which at least partially compensates for the alteration in the pulse amplitude. Giving the pulse amplitude a different value depending on whether the required speed is above or below the particular speed introduces a further variable into the system. This results in the entire speed range being divided into two or more successive speed ranges, in each of which the pulse amplitude has a different value. Thus in a system having two such successive speed ranges, the pulse amplitude is arranged to have a relatively low value in the lowest range and a relatively high value in the highest range. As the motor speed is increased over the lowest range, the pulse duration is increased up to its maximum at which point the switching arrangement operates and in consequence causes the pulse amplitude to increase from the relatively low to the relatively high value. Operation of the switching arrangement also alters the value of the feedback signal so as to reduce the pulse duration. For an infinitely variable speed control system, this reduction must exactly compensate for the increased pulse amplitude, in other words the total energy in each pulse must remain the same so that the motor speed does not change as a result of the switching action.

A consequence of dividing the entire speed range into two or more successive speed ranges is that the range of variation of the amplifier input signal and of the motor feedback signal is considerably reduced thus largely overcoming the problems previously discussed. For instance consider a system in which a speed range of 1600:1 is divided into four successive ranges, that is the switching arrangement is arranged to operate at three particular required speeds and depending on its state gives the pulse amplitude one of four specific values and also controls the value of the feedback signal accordingly. If each successive speed range has the same maximum to minimum ratio, as is preferable, this has a value of 6.3:1. Accordingly the minimum values of the feedback signal applied to the comparator and the signal which has to be amplified are only 1/6.3 of their maximum values. In comparison with a convention circuit of the type first discussed, this represents an increase by a factor of 254.

Speed control systems in accordance with the invention are especially suitable for controlling the paper drive motor of recording instruments. In order to permit accurate evaluation of the recording, it is very important that once the paper speed has been set, it should not change. Such systems are capable of providing such constant speed operation, even if the ambient temperature changes or the mains voltage fluctuates and have considerable advantages over the conventional mechanically operated speed control systems employed at present.

Figure 2A:
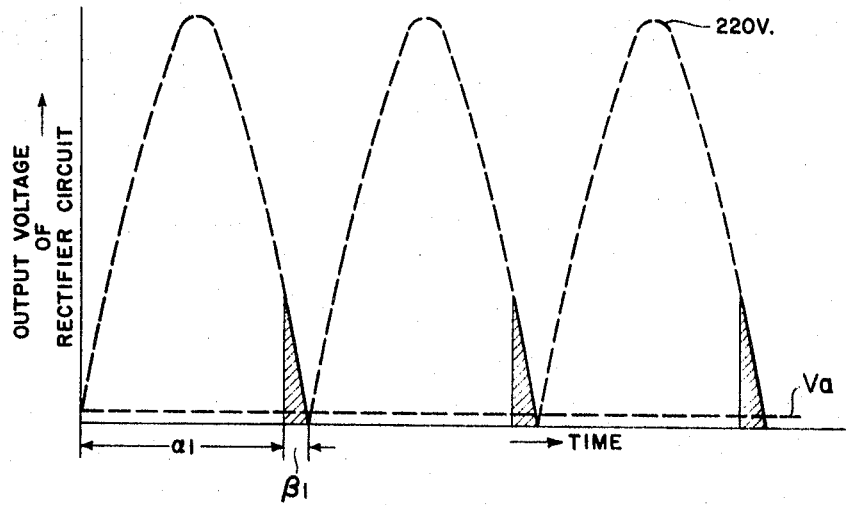
Figure 2B:
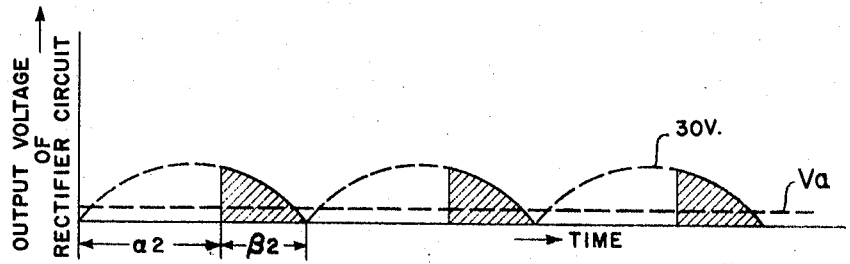

By way of example a DC motor speed control system in accordance with the invention will now be described with reference to the accompanying drawings in which:

FIG. 1 is a schematic electrical circuit diagram of the system, also showing the motor which it controls, and a load and a tachogenerator both coupled to be driven by the motor; and FIGS. 2A and 2B illustrate the energization of the motor.

Referring first to FIG. 1, the DC motor is designated 1, the load 2, and the tachogenerator 3. The latter produces an output voltage proportional to the motor speed.

The speed control system includes a motor speed set point device for selection of the required motor speed which in the present example is to be understood as having a range of from 1 to 1600 r.p.m. divided into two successive ranges of from 1 to 40 r.p.m. and from 40 to 1600 r.p.m. The set point device produces a current proportional to the required speed and for this purpose includes an infinitely variable or multiple value resistor or alternatively a large number of different value resistors together with a switching arrangement. For simplicity this is represented in FIG. 1 by a four position rotary switch having a contact 4 for connecting any one of four different value resistors 5 to one side of a DC source 6. A second contact 7 is ganged to move with the contact 4.

The current produced by the set point device is compared in a comparator 8 with the current produced by the tachogenerator 3. This latter current reaches the comparator 8 along a feedback path which includes either of two different value resistors 9 and 10 depending on the position of a contact 11 of a relay 12. The latter is controlled by the contact 7 of the rotary switch and is energized from a DC source 13. The comparator 8 produces an output or error signal representative of any error between the two currents applied to it, that is representative of any difference between the required and actual motor speeds. This error signal is applied to an operational amplifier 14 where it is amplified and subsequently applied to a control circuit 15 which controls two thyristors in a rectifier circuit 16. This latter circuit is energized with AC of either 220 or 30 volts depending on the position of a contact 17 of the relay 12 and produces current pulses energizing the motor 1. It comprises a full wave bridge rectifier incorporating the two thyristors just referred to. The control circuit 15 controls the instant in each half-cycle of the energizing voltage at which the appropriate thyristor is triggered and thus rendered conductive, in dependence on the amplitude of the error signal received from the amplifier 14. As the amplitude of the amplifier output signal increases from its minimum to its maximum value, so the instant of triggering is advanced from the end of the beginning of the half cycle.

As previously explained, for a constant load, the motor speed is dependent on the energy supplied to it and hence on the average voltage applied across it. With a pulse supply, the average voltage depends on the frequency of the pulse supply, the pulse duration and the pulse amplitude. In the present case, the pulse supply frequency is fixed and hence the average voltage is dependent only on the pulse duration and the pulse amplitude. The former is dependent on the instant of switching of the appropriate thyristor and the latter depends on whether the rectifier circuit 16 is energized from the 30 or 220 volt supply.

FIG. 2A shows hatched the voltage pulses which energize the motor 1 when the rectifier circuit 16 is energized with the 220 volt supply if the appropriate thyristor is triggered after a time angle $\alpha_1$, each pulse then having a duration which is shown as $B_1$. When averaged out, the voltage of these current pulses has a value which is represented by a DC value of $V_a$. FIG. 2B shows how triggering has to occur considerably earlier if the same average voltage $V_a$ is to be produced when the rectifier circuit is energized from the 30 volt supply.

The manner in which the values of certain components of the system is determined can be seen by describing its operation.

As the rotary switch having the contacts 4 and 7 is turned in an anticlockwise direction, the required spaced increases, that is the current applied to the comparator 8 increases. Considering such movement between the two leftmost positions of the switch, in which the relay contacts 11 and 17 are in the illustrated positions, the resulting increases in the error signal, and hence in the signal from the amplifier 14, causes the control circuit 15 to decrease the angle $\alpha_2$, that is trigger the appropriate thyristor in the rectifier circuit 16 earlier, so that the pulse duration increases. The average pulse voltages $V_a$ therefore increases and the motor speed consequentially increases. The output voltage of the tachogenerator 3 therefore also increases and hence a greater current is fed back to the comparator 8. This reduces the error signal so that eventually the motor speed stabilizes at that required by the set point device.

Consider now that the switch having the contacts 4 and 7 is turned further in an anticlockwise direction to the third position from the left. The current fed to the comparator 8 again increases thus tending to trigger the thyristors in the rectifier circuit 16 earlier. However, due to the movement of the contact 7, the relay 12 is now energized and as a result the two contacts 17 and 11 move to the right. Movement of the former causes the 220 volt supply to replace the 30 volt supply as energization for the rectifier circuit 16. Movement of the contact 11 to the right connects the resistor 10 into the feedback path instead of the resistor 9. The resistor 10 has a lower resistance than the resistor 9 and hence a larger feedback current is applied to the comparator 8. The error signal is therefore substantially reduced and hence the thyristors in the rectifier circuit 16 are triggered much later.

The result is therefore that firstly the pulse amplitude is increased and secondly that the pulse duration is decreased. Since the switch movement which has caused this is intended to increase the motor speed, the component values are chosen such that the average voltage $V_a$ increases by an amount dependent on the step in the speed range required. As previously explained, if the speed is to be infinitely variable, this step will be zero.

It is clear from FIG. 1 that the relay 12 is deenergized when the rotary switch is in the two positions producing the two lower motor speeds and is energized when in the other two positions, that is producing the two higher motor speeds. Thus the entire speed range of from 1 to 1600 r.p.m. is divided effectively into two successive ranges, in one of which the relay 12 is deenergized and in the other of which it is energized. The ratios of the maximum to minimum speed in the two ranges are equal so that the first range extends from 1 to 40 r.p.m. and the second from 40 to 1600 r.p.m. to the relay 12 switching at 40 r.p.m.

Division of the entire speed range into the two successive ranges considerably reduces the range of variation of the motor feedback signal and amplifier signals, as previously explained. For instance if the tachogenerator 3 produces a current of 4 ma. at 1600 r.p.m., in a conventional system the current at 1 r.p.m. would be 0.0025 ma. which is very difficult to compare with that representative of the required speed. With the present system, the current a 1 r.p.m. (and also at 40 r.p.m.) is 0.1 ma. which can be compared with no difficulty.

FIG. 2A also illustrates why accurate speed control using a conventional system is difficult if not impossible. A speed range of 1 to 1600 r.p.m. in such a system corresponds to a variation in $B_1$ of from 0° to 180°. At low speeds $B_1$ has to be very small. However when this is so, any variation in $B_1$, due to the steep slope of the voltage waveform produces a very large change in the area of the illustrated hatched area, that is the power taken by the motor. Hence temperature variations or supply voltage fluctuations causing only a small change in the instant of triggering may nevertheless alter the motor speed appreciably.

FIG. 2B shows how such variations or fluctuations are rendered considerably less important using a system in accordance with the invention. Due to the larger angle $B_2$, any change in the instant of triggering has a much smaller effect on the power taken by the motor.

Thus, there has been provided, in accordance with the present invention, an improved speed control circuit for a direct current motor which features a highly accurate speed control over an extremely wide range of speed variations for the motor.

The embodiments of the invention in which an exclusive property or privilege I claim are defined as follows:

1. A speed control system for a direct current motor, said system comprising a feedback circuit for maintaining the motor speed at substantially the required speed, means for producing a pulsed output signal for driving the motor, the pulses of said pulsed output signal having a duration controlled by an input control signal, selectively operable means for adjusting the magnitude of said input control signal whereby to control the pulse duration of said pulses and thereby to effect a control of the speed of operation of said motor, switching means coordinated with the operation of said selectively operable means, means responsive to said switching means for selectively controlling the amplitude of said pulses to a first amplitude during a first portion of the range of speed change of said motor and to a second amplitude during a second portion of said range, and means also responsive to said switching means for controlling the magnitude of the signal in said feedback circuit to a first and second value range, respectively, during said first and second portions of said range of speed change.

2. The invention as set forth in claim 1 wherein said feedback circuit includes a tachogenerator coupled to be driven by said motor, a resistance means, and a signal comparator, the output signal from said tachogenerator being connected through said resistance means to the one input of said comparator signal, said input control signal being connected to the other input of said comparator, the output of said comparator being applied to control said pulse duration, said resistance means comprising a first and a second resistor of different values, said first or second resistors being selectively connected in said feedback circuit by said switching means.

3. The invention as set forth in claim 3 wherein said means responsive to said switching means for controlling the amplitude of said pulses includes a first and a second alternating current power source of substantially different voltages, said first and second power sources being selectively connected by said switching means to said means for producing pulsed output signals.